United States Patent [19]
Honjo

[11] Patent Number: 6,006,007
[45] Date of Patent: Dec. 21, 1999

[54] OPTICAL DISK APPARATUS FOR RECORDING AND REPRODUCING COMPRESSION ENCODED VIDEO SIGNAL

[75] Inventor: Masahiro Honjo, Sakai, Japan

[73] Assignee: Matsushita Electric Industrial Co., Ltd., Osaka, Japan

[21] Appl. No.: 07/870,634

[22] Filed: Apr. 20, 1992

[30] Foreign Application Priority Data

Apr. 18, 1991 [JP] Japan ..................................... 3-086709

[51] Int. Cl.⁶ ............................ H04N 5/781; H04N 5/917
[52] U.S. Cl. .............................................. 386/125; 386/111
[58] Field of Search ..................................... 358/342, 335, 358/310, 135, 133, 12; 360/72, 33.1; 386/109, 111, 112, 125, 126, 46, 82, 70, 27, 33; H04N 5/781, 5/917

[56] References Cited

U.S. PATENT DOCUMENTS

| | | | |
|---|---|---|---|
| 5,089,899 | 2/1992 | Nomura et al. | 358/335 |
| 5,093,820 | 3/1992 | Maeda et al. | 369/50 |
| 5,122,886 | 6/1992 | Tanaka | 358/335 |
| 5,140,437 | 8/1992 | Yonemitsu et al. | 358/362 |

*Primary Examiner*—Robert Chevalier
*Attorney, Agent, or Firm*—Wenderoth, Lind & Ponack, L.L.P.

[57] ABSTRACT

During optical disk recording of a digital coded video signal, the numbers of infield or inframe encoded data frames or their address information are stored in an innermost or outermost region of an optical disk, and during playback, they are first retrieved for use as control data. Since the numbers or address information of the infield or inframe encoded data frames are acquired, a specific playback mode, e.g. high-speed playback or still picture reproduction, can readily be executed with advantageous effects through searching the address information.

4 Claims, 3 Drawing Sheets

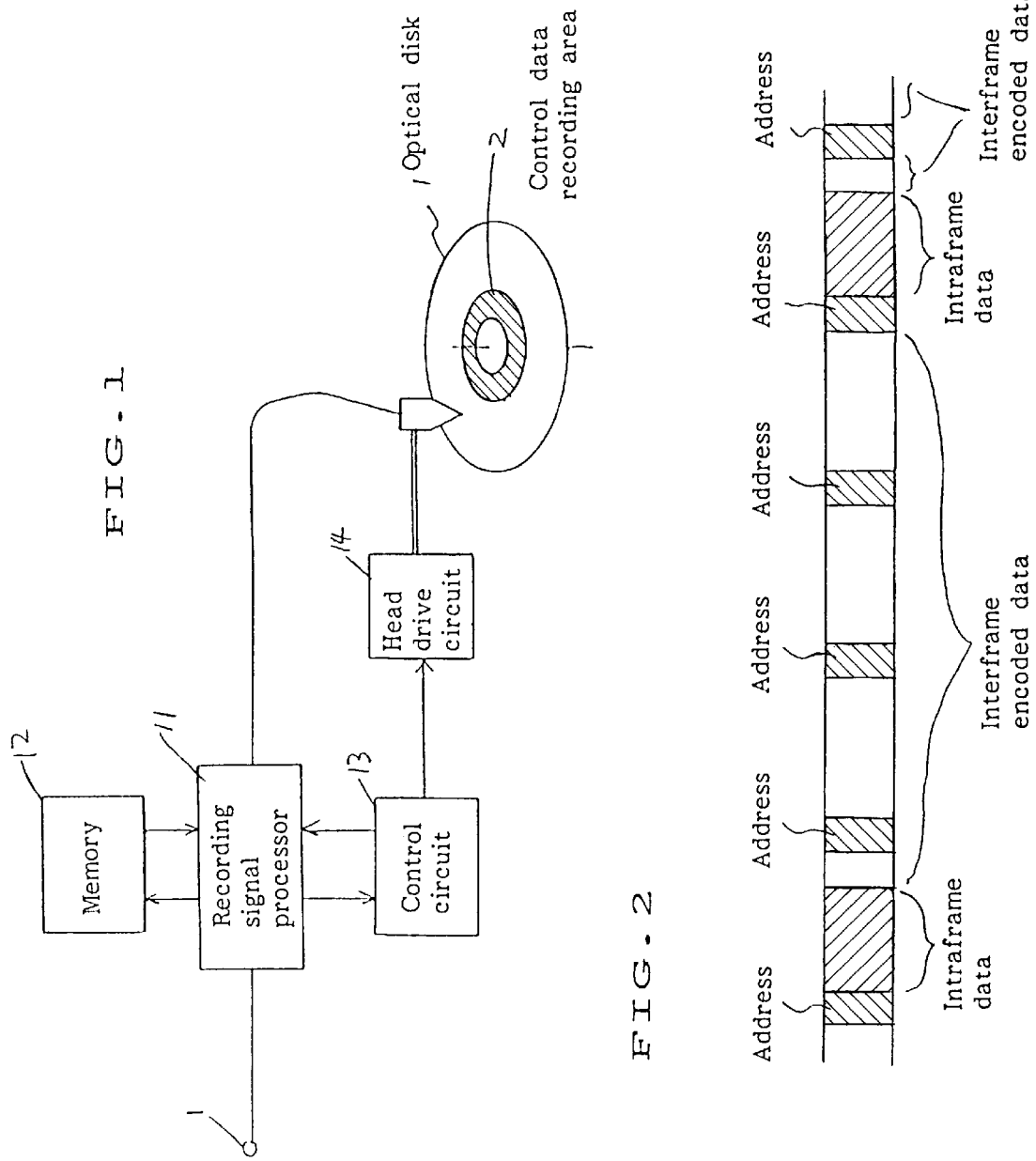

OPTICAL DISK APPARATUS FOR RECORDING AND REPRODUCING COMPRESSION ENCODED VIDEO SIGNAL

BACKGROUND OF THE INVENTION

1. Field of the Invention

The present invention relates to an optical disk apparatus for recording and reproducing on an optical disk a video signal which has been bandwidth compressed and encoded.

2. Field of the Invention

It is known that a common optical disk for storage of video signals has at an innermost region some control data recording areas where control data, e.g. data denoting a playback duration of the disk and the number of frames, are recorded.

Also, as bandwidth compression encoding techniques have been advanced, interfield or interframe encoding is now widely used in which data not only in one desired field or frame but also in its preceding and succeeding fields or frames are encoded at a time. This encoding technique is applicable to optical disk recording. With respect to specific playback modes including high-speed reviewing and still-picture reproduction, it is desired for reproduction of a quality picture to reconstruct fields or frames from the infield or inframe coded data respectively. However, a considerable length of time would be necessary to search and detect such infield or inframe encoded data.

SUMMARY OF THE INVENTION

It is an object of the present invention to provide an improved optical disk apparatus for recording and reproducing on an optical disk a digital video signal which has been bandwidth compressed through infield and timebase interfield encoding or inframe and timebase interframe encoding, which is capable of carrying out with ease specific and random access playback mode operations to produce a quality picture.

For achievement of the object, an optical disk apparatus according to the present invention is arranged in which during recording, the numbers or address information of infield or inframe encoded data frames is written as a control data into the innermost or outermost region of an optical disk. Also, during playback, the control data is first retrieved and fed to a control data memory for temporary storage.

For a and change specific mode playback operation, e.g. high-speed reviewing or still picture reproduction, and a random access playback operation, the numbers or address information of the infield or inframe encoded data frames is recovered from the control data stored in the control data memory and used for searching and playing back desired picture data.

BRIEF DESCRIPTION OF THE DRAWINGS

FIG. 1 is a block diagram of a recording system according to the present invention;

FIG. 2 is a schematic view of a track pattern for explaining the present invention;

DESCRIPTION OF THE PREFERRED EMBODIMENT

Figure 3:
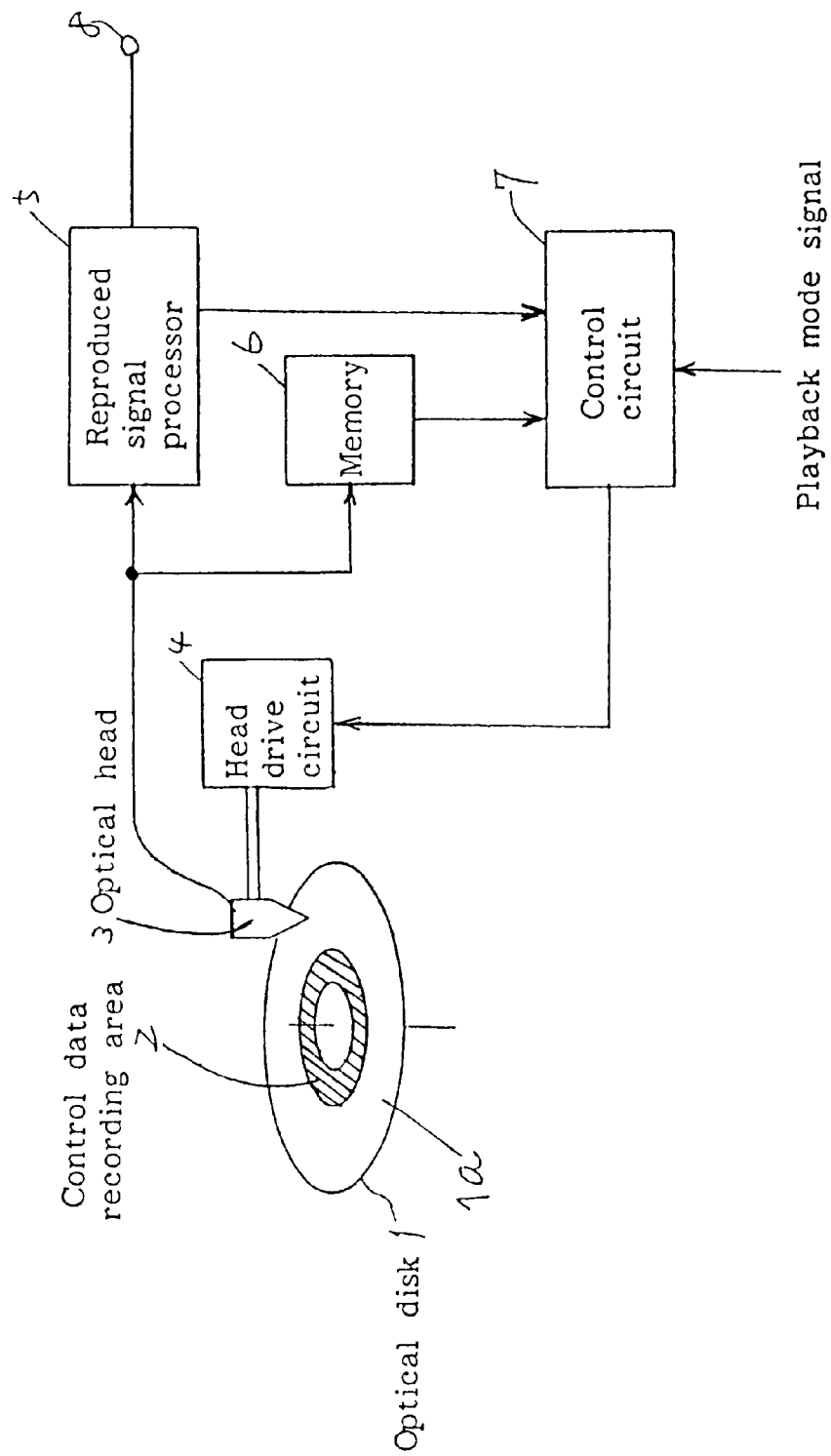
FIG. 3 is a block diagram of a playback system according to the present invention.

FIG. 1 is a block diagram of a video data recording system of an optical disk according to the present invention.

A video signal fed to an input terminal 1 is infield and interfield or inframe and interframe encoded by a recording signal processor circuit 11 into a bandwidth compressed code signal which is then formatted and digital modulated prior to being recorded onto an optical disk 1. More particularly, the video signal is infield or inframe encoded at equal intervals of a given number of frames, e.g. every 12th frame, and the remaining frames are interfield or interframe encoded.

A resultant recorded track pattern of the video signal on the optical disk 1 is illustrated in FIG. 2. As shown, the infield or inframe encoded data is allocated just after an address area and followed by the interfield or interframe encoded data. The infield or inframe data is now termed as an intraframe data. As is understood, one or more address areas are assigned between any two intraframe data areas. FIG. 2 shows four address areas assigned between two interframe data areas.

The present invention resides in writing and reading of information regarding the assignment of intraframe data of a video signal on a control data area of the recording track for best use.

At the recording mode, it is detected at which intervals the intraframe data frames of the video signal are assigned or in which address areas the intraframe data are carried and their positional information is stored in a memory 12 shown in FIG. 1. In action, the recording signal processor circuit 11 retrieves the positional information from the memory 12 upon completion of transmission of the video signal or at intervals of a given period and records the information onto an innermost region or control data recording area 2 of the optical disk 1.

A control circuit 13 is provided for instructing the recording signal processor circuit 11 to retrieve the positional information from the memory 12 and also, actuating an optical head driving circuit 14 to move to a predetermined location on the control data recording area 2.

FIG. 3 shows a playback system of the present invention, in which the recorded data stored in a video data recording area 1a of the optical disk 1 is read with an optical head 3 and decoded by a reproduced signal processor circuit 5 into a video signal which is then transmitted from an output terminal 8.

Prior to starting the signal reproducing operation from the optical disk, the positional information, e.g. the numbers of intraframe data areas or the address areas which contain intraframe data, is retrieved from the control data recording area 2 of the optical disk 1 and stored in a memory 6.

In a variable-speed, e.g. fast speed, playback mode, the address data needed for access action is transferred from the reproduced signal processor circuit 5 to a control circuit 7 and simultaneously, the positional information of the intraframe data areas is fed from the memory 6 to the control circuit 7. Then, the control circuit 7 calculates an address area to be accessed by the optical head 3 and sends its signal to an optical head driving circuit 4 for access movement. As the result, a variable-speed playback operation will be executed smoothly.

The shifting from the variable-speed playback operation to a normal speed playback operation or vice versa can be triggered by entry of a command signal by an operator, e.g. through pressing a relevant buttonswitch. The command signal is transmitted to the control circuit 7 which in turn controls the optical head driving circuit 4 for execution of a selected mode playback.

Figure 4:
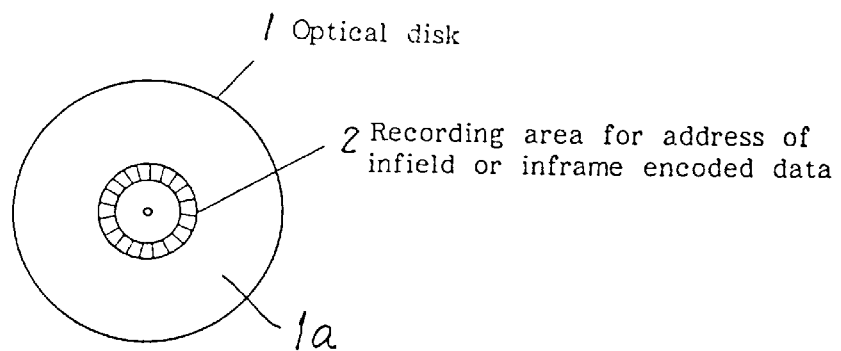
FIG. 4 is a schematic view of a disk assignment for explaining the present invention.

FIG. 4 illustrates the video data recording area 1a and the control data recording area 2 arranged at the innermost area of an optical disk 1 for storage of the numbers of intraframe data recorded fields, frames, or sectors and their address information.

The optical disk apparatus retrieves from the control data recording area 2 a variety of desired control data including the numbers of infield or inframe encoded data areas and their address information and feed them to the memory 6 where they are temporarily stored together with the playback time of the disk and the number of frames.

The control data recording area 2 may be arranged at the outermost region or any other region of the optical disk rather than in the innermost region described in the embodiment.

During the high-speed playback mode, the intraframe data areas only are retrieved and the interference with interfield or interframe encoded data will thus be avoided.

Also, upon random access, each intraframe data area just before the target frame is first retrieved and the picture quality declination at rise time will be prevented.

Figure 5:
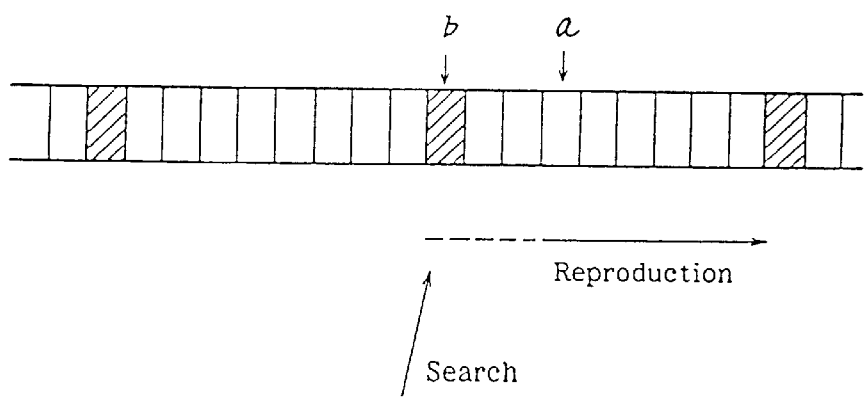
FIG. 5 is a schematic view of a portion of the track pattern of the present invention.

More specifically, when a frame area denoted by a in FIG. 5 is selected, the playback action starts with a preceding intraframe data area, denoted by b, which contains an infield or inframe data. The display may be commenced with the intraframe data b or the target data a with its preceding data being muted.

Accordingly, a considerable degree of picture quality declination which is caused by direct addressing to the data area a will successfully be prevented.

As the address information on infield or inframe encoded data recorded areas has been acknowledged, any specific playback mode will be executed with advantageous effects.

What is claimed is:

1. An optical disk having recorded thereon bandwidth compressed data containing both infield or inframe encoded data which have been produced by infield or inframe encoding of a video signal and interfield or interframe encoded data which have been produced by interfield or interframe encoding of the video signal, the improvement comprising a specific recording area which is located at an innermost or outermost end of the optical disk and which has recorded therein position information indicating positions of only the infield or inframe encoded data.

2. An optical disk apparatus for recording bandwidth compressed video data produced by infield or inframe encoding and interfield or interframe encoding a video signal onto an optical disk which has a data recording area including a specific recording area located at an innermost or outermost end of the optical disk, said apparatus comprising:

recording signal processing means for subjecting some frames of an input video signal to an infield or inframe encoding and the remaining frames of the input video signal to an interfield or interframe encoding to obtain bandwidth compressed recording data containing both infield or inframe encoded data and interfield or interframe encoded data;

memory means for storing therein position information indicating positions of only the infield or inframe encoded data in the bandwidth compressed recording data;

optical head means for writing a signal fed thereto onto the data recording area of the optical disk;

optical head driving means for driving the optical head means to move to a position in the data recording area;

control means for controlling the recording signal processing means and the optical head driving means so as to feed the bandwidth compressed recording data to the optical head means and move the optical head means to a position in the data recording area except for the specific recording area so that the bandwidth compressed recording data are recorded in the data recording area except for the specific recording area, and so as to feed at a specific timing the position information stored in the memory means to the optical head means and move the optical head means to a position in the specific recording area so that the position information is recorded in the specific recording area.

3. An optical disk apparatus for reproducing a video signal which has been recorded in a data recording area on an optical disk as bandwidth compressed video data containing both infield or inframe encoded data produced by infield or inframe encoding some frames of an original video signal and interfield or interframe encoded data produced by interfield or interframe encoding the remaining frames of the original video signal, the data recording area including at an innermost or outermost end the optical disk a specific recording area having recorded therein position information indicating positions of only the infield or inframe encoded data in the bandwidth compressed video data, said apparatus comprising:

optical head means for retrieving data recorded on the optical disk;

optical head driving means for driving the optical head means to move to a desired position in the data recording area of the optical disk, said optical head driving means first driving the optical head means to move to the specific recording area to retrieve therefrom the position information;

memory means for storing therein the retrieved position information;

control means for calculating an access position to be accessed for retrieving the bandwidth compressed video data from the position information stored in the memory means, and for controlling the optical head driving means according to the calculated access position to move the optical head means to the access position to thereby retrieve the bandwidth compressed video data; and reproduced signal processing means for decoding the retrieved bandwidth compressed video data to obtain a reproduced video signal.

4. An apparatus according to claim 3, wherein said control means controls, in a quick reproduction mode, the optical head driving means to move only to positions indicated by the position information stored in the memory means to retrieve only the infield or inframe encoded data.

* * * * *